United States Patent
Tong et al.

(10) Patent No.: US 7,359,851 B2
(45) Date of Patent: Apr. 15, 2008

(54) METHOD OF IDENTIFYING THE LANGUAGE OF A TEXTUAL PASSAGE USING SHORT WORD AND/OR N-GRAM COMPARISONS

(75) Inventors: Xiang Tong, Beaverton, OR (US); Gregory T. Grefenstette, Gieres (FR); David A. Evans, Pittsburgh, PA (US)

(73) Assignee: Clairvoyance Corporation, Pittsburgh, PA (US)

( * ) Notice: Subject to any disclaimer, the term of this patent is extended or adjusted under 35 U.S.C. 154(b) by 820 days.

(21) Appl. No.: 10/757,313

(22) Filed: Jan. 14, 2004

(65) Prior Publication Data

US 2005/0154578 A1    Jul. 14, 2005

(51) Int. Cl.
   *G06F 17/20* (2006.01)
   *G06F 17/27* (2006.01)
(52) U.S. Cl. .............................................. 704/8; 704/9
(58) Field of Classification Search ................ 704/8, 704/9
   See application file for complete search history.

(56) References Cited

U.S. PATENT DOCUMENTS

| 5,062,143 | A | | 10/1991 | Schmitt |
|---|---|---|---|---|
| 5,418,951 | A | * | 5/1995 | Damashek ................... 707/5 |
| 5,548,507 | A | | 8/1996 | Martino et al. |
| 6,009,382 | A | | 12/1999 | Martino et al. |
| 6,023,670 | A | | 2/2000 | Martino et al. |
| 6,076,051 | A | * | 6/2000 | Messerly et al. ............. 704/9 |
| 6,167,369 | A | * | 12/2000 | Schulze ........................ 704/9 |
| 6,216,102 | B1 | | 4/2001 | Martino et al. |
| 6,272,456 | B1 | * | 8/2001 | de Campos ................... 704/8 |

OTHER PUBLICATIONS

Cavnar et al ("N-Gram Based Text Categorization", Proceedings of SDAIR-94, 3rd Annual Symposium on Document Analysis and Information Retrieval, 1994).*

Grefenstette, Gregory, "Comparing Two Language Identification Schemes," 3rd International Conference on Statistical Analysis of Textual Data (JADT), Rome, Italy; Dec. 1995, vol. 2, pp. 263-268.

* cited by examiner

*Primary Examiner*—David Hudspeth
*Assistant Examiner*—Samuel G Neway
(74) *Attorney, Agent, or Firm*—Jones Day; Blaney Harper

(57) ABSTRACT

A method and system identifying the language of a textual passage is disclosed. The method and system includes parsing the textual passage into n-grams and assigning an initial weight to each n-gram, and adjusting the weight initially assigned to a word or n-gram parsed from the textual passage. The initially assigned weight is adjusted in a manner proportionate to the inverse of the number of languages within which such words or n-grams appear. Reducing the weight assigned to such words or n-grams diminishes—without completely eliminating—their importance in comparison to other words or n-grams parsed from the same textual passage when determining the language of a passage. The method and system of the present invention appropriately weighs the short words or n-grams common to multiple languages without affecting the short words or n-grams that are uncommon to several languages.

19 Claims, 3 Drawing Sheets

METHOD OF IDENTIFYING THE LANGUAGE OF A TEXTUAL PASSAGE USING SHORT WORD AND/OR N-GRAM COMPARISONS

TECHNICAL FIELD

This invention relates to a method of identifying the language in which a segment of text is written and more particularly, to a method of language identification by comparing short words and/or n-grams to multiple language databases.

BACKGROUND

The increased collection and indexing of publications often requires that the language in which the publications are written be known. For the purposes of this specification, the term "language" shall mean a natural language (i.e., human language) used for personal communication, such as English, French, Spanish, Portuguese, German, etc., though the method presented here is not limited to natural languages, and may also be applied to artificial languages such as programming languages. For example, when indexing a database of documents, it may be helpful to classify the documents according to their corresponding languages. Language identification for some texts may be simple, for example, a publication that always appears in only one language. However, for a significant number of texts, particularly texts from a mixed database such as the World Wide Web, language identification is not so easy.

In order to assist document classifiers with identifying the language of a document's text, an XML (extensible Markup Language) marking may be manually placed in the text of the document. For example one can place the tags: <p xml:lang="de"></p> around either side of a paragraph to show that the language of the paragraph is German, since "de" is the ISO 639 two-letter language code for German (See http://www.ietf.org/rfc/rfc1766.txt for a description of XML language markup, and www.ics.uci.edu/pub/ietf/http/related/iso639.txt for a description of ISO 639 codes.) However, a majority of documents do not contain such an XML marking. Thus, it is desirable to use an automated language identification tool, such as a computer program, to determine the language of the document. There are a number of language identification programs that are known in the art.

One such program compares short or frequent words (i.e., the, in, of, that for English; el, la, los, las, en, de, que for Spanish, etc.) in the document with common short words from a plurality of different languages. The common short words from each available language are stored in corresponding databases. Thus, after comparing the document's short words with the language databases, the program identifies the language associated with the database containing the greatest number of short words from the document text. That is, the corresponding database yielding the highest frequency of short words from the textual passage results in identifying the text's language. See descriptions of these methods in both Beesley, Kenneth R., "Language Identifier: A Computer Program for Automatic Natural-Language Identification of On-Line Text," in the Proceedings of the 29th Annual Conference of the American Translators Association, 1988, and in Grefenstette, Gregory, "Comparing Two Language Identification Schemes," in Proceedings of 3.sup.rd International Conference on Statistical Analysis of Textual Data (JADT 1995), Rome, Italy; December, 1995, vol. II, pp. 263-268.

A similar approach to language identification involves the use of n-gram analysis. An n-gram is a set of "n" consecutive characters extracted from a word. Typical values for n are 2, 3, or 4. Assuming such values for n, the respective names for such n-grams are "bi-grams", "tri-grams", and "quad-grams". The frequency approach used for analyzing short words can also be applied to n-grams because the main idea is that similar words will have a high proportion of n-grams in common. Thus, upon calculating the frequency profiles for each n-gram according to each language, the language yielding the highest frequency is determined to be the language in which the text is written. See description of these methods in both Cavnar, William B., et al., "N-Gram-Based Text Categorization," in Symposium on Document Analysis and Information Retrieval, 1994, and Dunning, Ted, "Statistical Identification of Language," CLR Tech Report (MCCS-94-273), 1994.

Another known method of language identification is described U.S. Pat. No. 5,062,143. In this method a text is divided into tri-grams. The tri-grams are compared with key sets of common tri-grams of various languages. The number of tri-grams found for each language is divided by the total number of tri-grams found in the original text. The language possessing the highest ratio of identified tri-grams is retained as the identity of the original text. The approach of the present invention differs from this particular prior art in providing a significantly different method of comparing n-grams (the present invention is not limited to tri-grams) and for weighting and using the n-grams retained in language key sets.

In another known method of language identification (U.S. Pat. No. 6,216,102) the most common words in each language are truncated to a predetermined length and stored in a key table for that language. When the language identifier is presented with a new text to identify, the words in the text are truncated to this predetermined length and each truncated word is compared to each language key table. The language key table that contains the maximum number of truncated words in common with the presented text is chosen as the language of the text. U.S. Pat. Nos. 5,548,507, 6,009,382, and 6,023,670 are variants of this same method, but the variants do not truncate words before comparison. The method of the present invention differs from all these variants significantly in extracting a plurality of information bearing n-grams from each word in the input text, including word endings, which are good characteristics of languages ignored by this method. The scoring method we reveal in the present invention is more sophisticated than this simple counting technique.

The problem with using a frequency approach with either short words or n-grams is that some languages have similar short words and similar n-grams. For example, the word "que" is present in the French, Spanish, and Portuguese languages. The presence of the same word, or n-gram, such as "que", in multiple languages has the capacity to distort the frequency analysis. Some current language identification methods including those cited above ignore this frequency distortion problem and others (e.g., U.S. Pat. No. 6,167,369) simply remove similar words from the frequency analysis. Thus, there is a need to address the problem associated with the same word(s) or same n-gram appearing in multiple languages appropriately so as to improve the accuracy of language identification

OBJECTS OF THE INVENTION

It is an object of the invention to identify the language in which a textual passage is written with an accuracy exceeding that of the prior art.

It is another object of the invention to identify the language of a textual passage using the least number of words possible.

It is another object of the invention to use short words from the textual passage to identify the passage's language.

It is a further object of the invention to use n-grams of the words of the textual passage to identify the passage's language.

It is even a further object of the invention to use both short words and n-grams of the short and other words from the textual passage to identify the passage's language.

SUMMARY OF THE INVENTION

The present invention is a method for increasing the likelihood of identifying the language of a textual passage. The novel method of the present invention increases the likelihood of language identification by adjusting the weight initially assigned to a word or n-gram parsed from the textual passage. The original weight is adjusted in a manner proportionate to the inverse of the number of languages within which such words or n-grams appear. Reducing the weight assigned to such words or n-grams diminishes—without completely eliminating—their importance in comparison to other words or n-grams parsed from the same textual passage when determining the language of a passage. That is, the method of the present invention appropriately weighs the short words or n-grams common to multiple languages without affecting the short words or n-grams that are uncommon to several languages.

Accordingly, the present invention determines the language of a textual passage using the following sequence of steps:

parsing the textual passage into a plurality of n-grams;
  comparing each of the n-grams against a plurality of databases, wherein each of the databases comprises a list of weighted n-grams associated with a different language;
  determining an initial weight for each of the n-grams in each list for each different language as being the number of times that that n-gram appears in a reference corpus of text for that language divided by the total number of n-grams in that reference corpus for that language;
  determining the number of databases within which each of said n-grams appears;
  altering the initial weight for each of the n-grams by multiplying the initial weight by the inverse of the number of databases within which each of said n-grams appears;
  calculating a language weight for this text passage by taking the sum, per language, over all the n-grams in the text passage of the values found by multiplying the number of times each n-gram appears in the text passage by the altered initial weight for that n-gram in that language;
  choosing as language for the textual passage the language for which the language weight thus calculated is the greatest.

The features and advantages of the present invention will become more apparent in light of the following detailed description of exemplary embodiments thereof as illustrated in the accompanying drawings.

DESCRIPTION OF THE PREFERRED EMBODIMENTS

Figure 1:
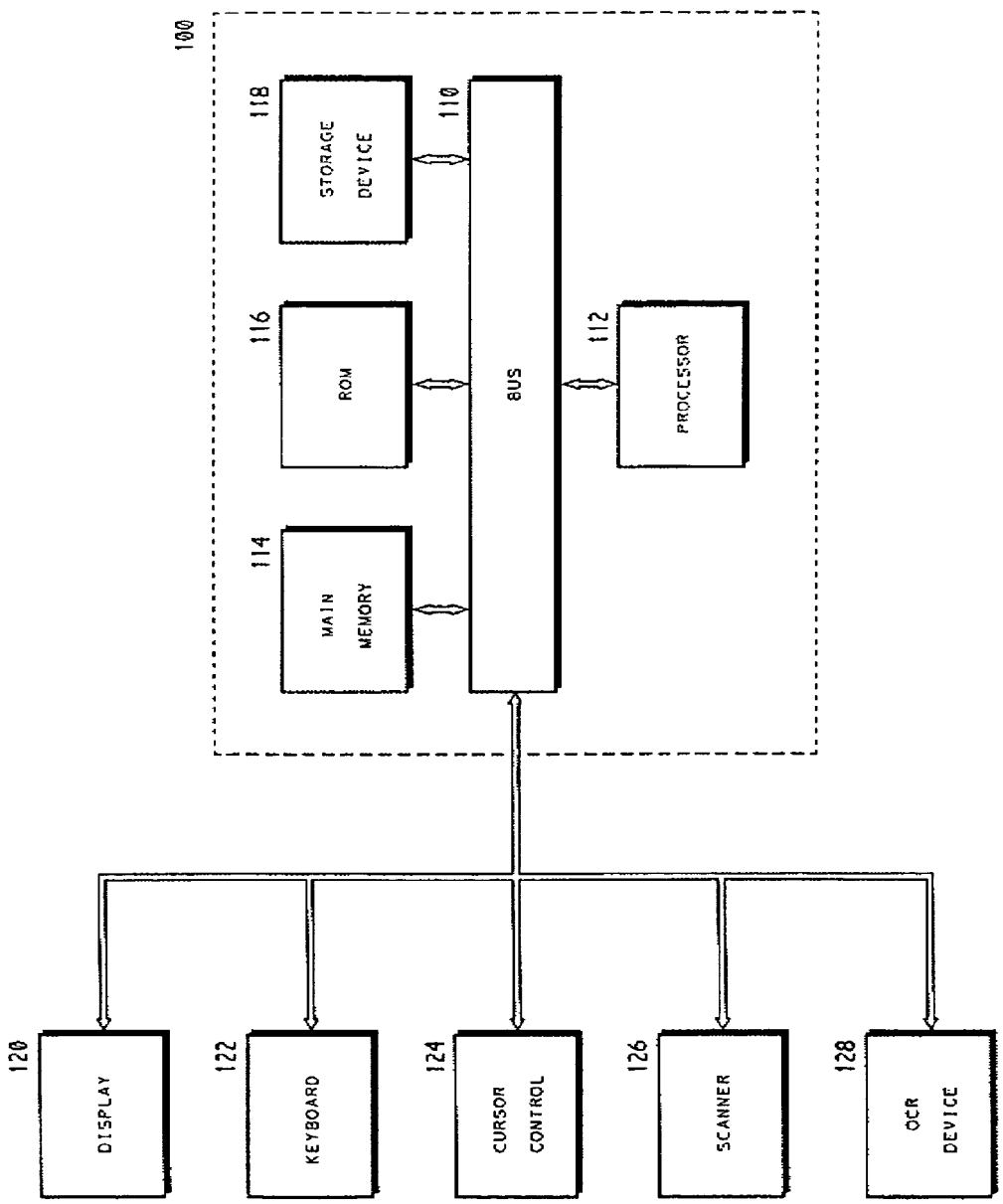
FIG. 1 is a high-level block diagram of a computer system with which an embodiment of the present invention can be implemented.

Referring to FIG. 1, there is shown a high-level block diagram of a computer system 100 with which an embodiment of the present invention can be implemented. Computer system 100 includes a bus 110 or other communication mechanism for communicating information and a processor 112, which is coupled to the bus 110, for processing information. Computer system 100 further comprises a main memory 114, such as a random access memory (RAM) and/or another dynamic storage device, for storing information and instructions to be executed by the processor 112. For example, the main memory is capable of storing a program, which is a sequence of computer readable instructions, for performing the method of the present invention. The main memory 114 may also be used for storing temporary variables or other intermediate information during execution of instructions by the processor 112.

Computer system 100 also comprises a read only memory (ROM) 116 and/or another static storage device. The ROM is coupled to the bus 110 for storing static information and instructions for the processor 112. A data storage device 118, such as a magnetic disk or optical disk and its corresponding disk drive, can also be coupled to the bus 110 for storing both dynamic and static information and instructions.

Input and output devices can also be coupled to the computer system 100 via the bus 110. For example, the computer system 100 uses a display unit 120, such as a cathode ray tube (CRT), for displaying information to a computer user. The computer system 100 further uses a keyboard 122 and a cursor control 124, such as a mouse. In addition, the computer system 100 may employ a scanner 126 for converting paper documents into a computer readable format (i.e., a document image) and an optical character recognition (OCR) device 128 to convert that format into document text that can be stored in the main memory 114 or the storage device 118. Alternatively, the functionality of the OCR device 128 can be implemented in software, by the processor 112 executing instructions stored in the main memory. In yet another embodiment, the scanner 126 and OCR device 128 can be combined into a single device configured to both scan a paper document and recognize characters thereon to create a document text.

The present invention is a method of identifying the language of a textual passage that can be performed via a computer program that operates on a computer system, such as the one illustrated in FIG. 1. According to one embodiment, language identification is performed by the computer system 100 in response to the processor 112 executing sequences of instructions contained in the main memory 114. Such instructions may be read into the main memory 114 from another computer-readable medium, such as the data storage device 118. Execution of the sequences of instructions contained in the main memory 114 causes the processor 112 to perform the method steps that will be described hereafter. In alternative embodiments, hard-wired circuitry could replace or be used in combination with software instructions to implement the present invention. Thus, the present invention is not limited to any specific combination of hardware circuitry and software.

Figure 2:
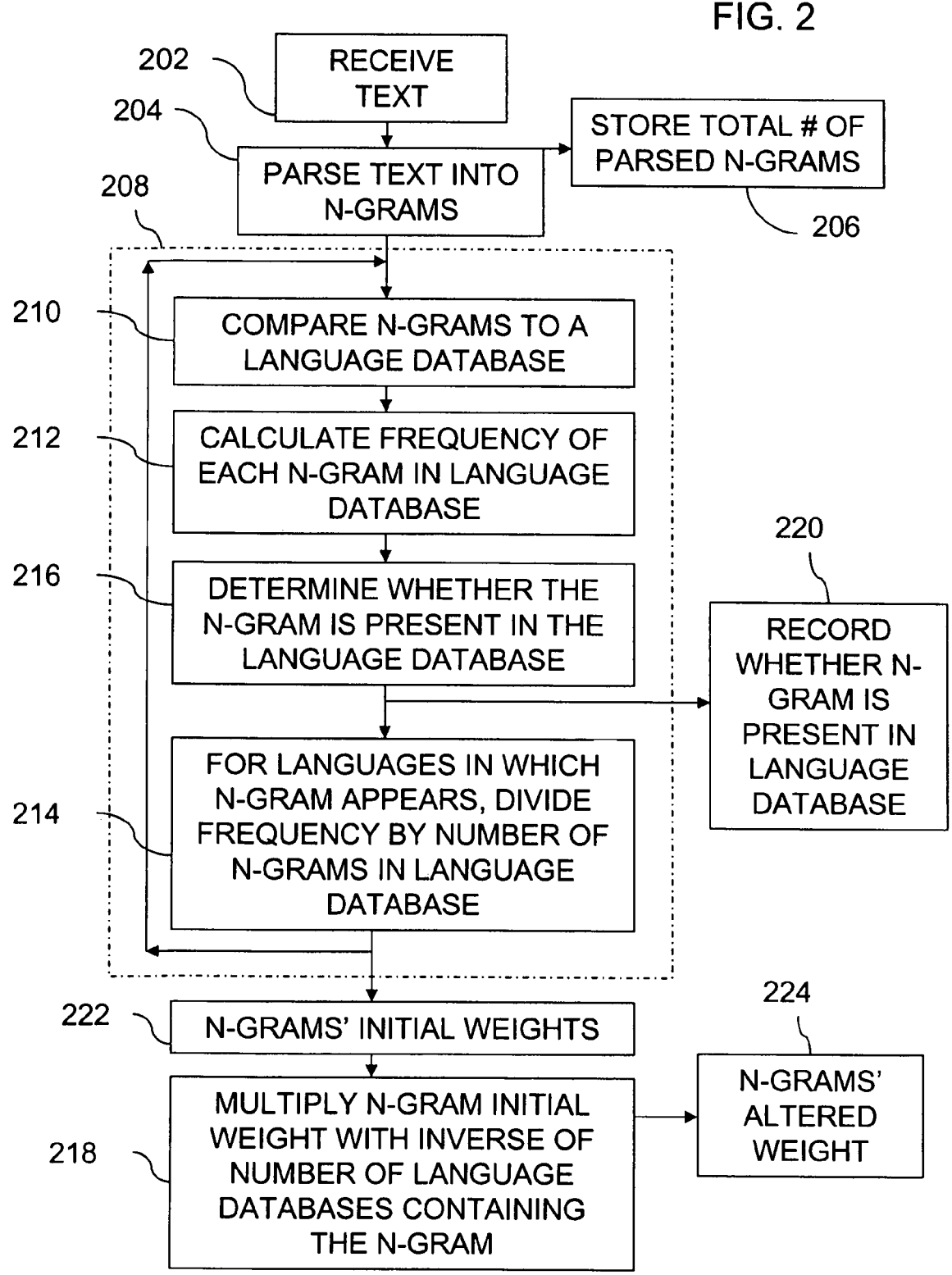
FIG. 2 is a process-flow diagram of an embodiment of the present invention.
Figure 3:
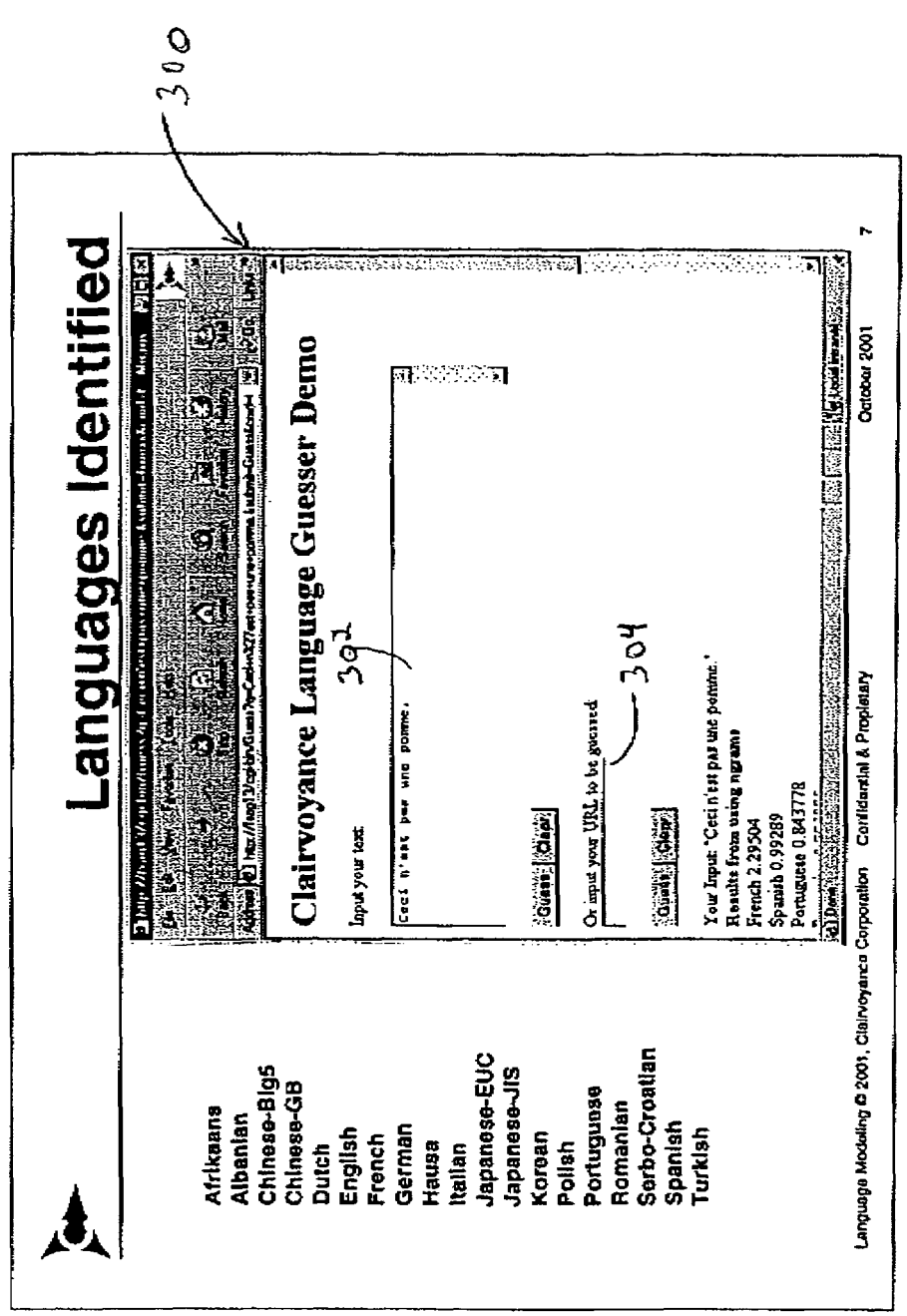
FIG. 3 is an illustration of a graphical user interface via which a user can enter text to the computer system illustrated in FIG. 1.

Referring to FIG. 2, there is shown a process-flow diagram for a method of determining the language of a textual passage. The method can be implemented on the computer system 100 illustrated in FIG. 1. For example, referring back to FIG. 2, an embodiment of the method of the present invention includes the step of providing the computer system 100 with a textual passage 202. The computer system 100 can receive the textual passage via a graphical user interface 300—illustrated in FIG. 3—presented on the display 120 shown in FIG. 1. That is, the textual passage can be directly entered by a user typing text via a keyboard 122—FIG. 1—into block 302 of the graphical user interface or by entering a Uniform Resource Locator (URL) into block 304, wherein the content of the URL has text that a user wishes to identify.

Additionally, the computer system may receive a textual passage that is scanned into the computer system by the scanner 126 and/or OCR device 128—FIG. 1. Whether the text is directly entered by a user, indirectly entered via a URL or scanned into the computer system, it is preferred that the text input include at least twenty (20) words and it is especially preferred that the text include at least forty (40) words.

Continuing to refer to FIG. 2, upon receiving the textual passage 202, the computer system parses the text into a plurality of short words and/or n-grams 204. The present invention can identify the language of the text using short words, n-grams, or both. To reduce the overall length of the description of the preferred embodiment of the present invention, the remainder of the description will only discuss using n-grams to identify the language of the text. Nevertheless, the scope the present invention is not limited to methods using n-grams but includes using other types of n-grams such as anchored n-grams or replacement-type n-grams, described below, and shall include using short words, either individually or in combination with any or all of these n-grams.

As discussed above, an n-gram is a set of "n" consecutive characters extracted from a string, such as a word. Typical values for "n" are 2, 3, or 4. Those values for "n" correspond to the use of bi-grams, tri-grams and quad-grams, respectively. A string—word—can be parsed into a set of overlapping n-grams. Additionally, blanks, represented herein as "_", can also be appended to the beginning and ending of the word.

For example, the word "data" (with a leading and trailing blank space) can be parsed into the following set of bi-grams: _d, da, at, ta, and a_; and tri-grams: _da, dat, ata, and ta_; and quad-grams: _dat, data, ata_. Generally, a word of length "k", padded with a preceding and trailing blank, will have k-n+3 consecutive overlapping n-grams—k+1 bi-grams, k tri-grams, k-1 quad-grams, and so on. Other types of n-grams that can alternatively or conjointly be used by this method such as anchored n-grams or replacement-type n-grams are described below. Upon parsing the textual passage into a plurality of n-grams 204, the total number of resulting n-grams is calculated and stored 206. One such method of calculating and storing the number of n-grams is disclosed in U.S. Pat. No. 5,062,143, which is hereby incorporated by reference.

The succeeding step includes attributing an initial weighting factor for each parsed n-gram 208, wherein the initial weighting factor is representative of the n-gram's relevance to a particular language. Determining each n-gram's initial weighting factor, therefore, begins with comparing each parsed n-gram with a database of n-grams for a particular language 210. The comparison results in calculating the frequency with which each n-gram is present in the n-gram language database 212. This frequency is the number of times a parsed n-gram appears in a language n-gram database, derived from a reference corpus of text known to be written in the particular language. The comparison between each n-gram and the n-gram language database also results in a determination of whether the n-gram is present within the language database 216. The answer to this question is stored within the computer system in step 220 and will be used to adjust the initial weighting factor discussed below. The step of determining whether the n-gram is present within the language database 216 can be performed before, after or currently with the step of calculating the frequency of each n-gram in the language database 212. Furthermore, step 216 can be performed as part of steps within the frame 208 or outside that frame.

The frequency with which each n-gram appears in the n-gram language database is thereafter divided by the total number of n-grams in the n-gram language database 214. The resulting quotient is equal to the n-gram's initial weighting factor 222. Thus, an initial weighting factor is assigned to each parsed n-gram, as that n-gram relates to a particular language. In order to assign another initial weighting factor to that same n-gram, as the n-gram relates to other languages, the parsed n-gram is compared to another language database that includes n-grams representative of that other language. That is, the process of steps 208, 210, 212, 214 and 216 is repeated for each language with which the n-gram is compared. Parsed n-grams can be compared to all relevant and/or available language databases such that each n-gram is individually compared to all language databases sequentially or the parsed n-grams can be sequentially compared to the language databases as an entire group.

After comparing the parsed n-grams to the language databases and assigning an initial weighting factor to each n-gram, as that n-gram relates to each language database, the initial weighting factors are adjusted. The weighting factors are adjusted to account for the same n-gram appearing in multiple language databases. Adjusting the n-grams' weighting factors improves the accuracy of determining the language of the textual passage.

As discussed above with respect to step 216, the method of the present invention determines whether each n-gram is present in each particular language database. The number of language databases, within which each n-gram is present, is tabulated and stored 220. The weighting factor for each n-gram that is present in more than one language database is adjusted by multiplying the initial weighting factor and the inverse of the number of databases within which the corresponding n-gram is found 218. In other words, the adjusted weighting factor is equal to the initial weighting factor divided by the number of language databases containing the corresponding n-gram. The adjusted weighting 224 for each n-gram, per language, is summed together providing a passage weight for each language. If the same n-gram appears more than once in a text passage, each instance contributes the adjusted weighting for the n-gram to the sum.

The language that has the highest passage weight for the text passage is chosen as the language for the passage. Since each language has a passage weight calculated by this method, it is also possible to rank the possible languages that a text passage may be in. For example, it could be that the text passage has a text weight of 2.29504 for French, of 0.99289 for Spanish, and of 0.843778 for Portuguese, etc. By further comparison of these passage weights, it might be possible to give a level of confidence in the language identification obtained. For example, if the difference between passage weights between the two highest ranked languages was very small, the system might indicate that the text may be one of two languages.

In alternate embodiments of the present invention special types of n-grams can be used to identify the language of the textual passage. As discussed above, n-grams can be bi-grams, tri-grams, quad-grams, etc. Special types of these n-grams, such as anchored n-grams or replacement-type n-grams can be used to identify the language of the textual passage. An anchored n-gram is an n-gram containing an anchor point. The n-gram may be sequential or non-sequential.

For example, the word "database" can be parsed into an anchored n-gram. Assuming the anchor point is the letter "d" and the sequence is two (2), which represents every other letter, the word "database" can be parsed into the following respective bi-grams, tri-grams, and quad-grams: dt; dtb; and dtbs. Similarly, assuming the anchor point is the letter "e" and the sequence is one (1), which represents every consecutive letter, the word "database" can be parsed into the following respective bi-grams, tri-grams, and quad-grams: se; ase; and base.

A replacement-type n-gram is an n-gram that replaces at least one character with another character. For example, a substitution table could be created that replace vowels "a", "e", "i", "o" and "u" with the letter "V". Using such a table, the following tri-grams would be parsed from the word "database": _dV, dVt, VtV, tVb, VbV, bVs, VsV, and sV_. After the textual passage is parsed into either anchored n-grams or replacement-type n-grams, those n-grams can be compared to the language databases and follow the same process described above with respect to FIG. 2 to identify the language of such text.

In an alternative embodiment of the invention, the n-grams and their statistics from each language database, including their initial weighting factors, are compiled into a single table and need not be stored or accessed in separate collections for each language database. As will be apparent to practitioners of the art, there are many alternative methods for compiling the essential information from separate language databases into a single, unified table. For example, the first column of such a table could be used to list the unique union of all the n-grams found in every language database. The second and subsequent columns, one for each language database, could be used to record the statistics of each n-gram in the table as found in the corresponding language database, in particular by recording the statistic (such as the initial weighting factor) in the table cell created by the intersection of the table row of the n-gram with the table column for the language database. As practitioners of the art well understand, information in such a table could be used to calculate all the weights required by the invention and could be used, in tabular or other form, to support the scoring of n-grams from the texts whose language is to be determined.

In yet another alternative embodiment of the invention, the number of text n-grams used by the system does not have to be the same for each language database. Rather, the number can be determined as needed for each language. Thus, a language whose n-gram features are highly distinctive may require fewer n-grams to be scored from the text to determine whether the text is in the language. Similarly, languages that are very similar in n-gram features may require more n-grams to be scored from the text to determine whether the text is from one or the other of the languages. Further, the n-grams from the text can be scored in groups (for example, of one, two, or three) as they are derived from the text and the score for each language can be accumulated and assessed after each update with the processing of the next unit. The procedure to score n-grams from the text can terminate whenever the accumulated score for a particular language reaches a minimum level of confidence for the language, at which point the text can be assigned to such a language. Minimum levels of confidence can be represented in various ways, including, but not limited to: (1) the relative or normalized difference between the score of the highest scoring language and the score of the next highest scoring language; (2) an absolute value.

Although the invention has been described and illustrated with respect to the exemplary embodiments thereof, it should be understood by those skilled in the art that the foregoing and various other changes, omissions, and additions may be made without departing from the spirit and scope of the invention.

What is claimed is:

1. A method of determining the language of a textual passage, the method comprising the steps of:
   (a) parsing said textual passage into plural n-grams;
   (b) comparing each of said plural n-grams with a plurality of databases, wherein each of said databases comprises multiple n-grams associated with a specific language;
   (c) determining an initial weight for each of said plural n-grams, per language, by calculating the frequency with which each of said plural n-grams appears in each of said databases and dividing said frequency by the total number of the multiple n-grams in said respective database;
   (d) determining the number of said databases within which each of said plural n-grams appear;
   (e) altering said initial weight for each of said plural n-grams by multiplying said initial weight with the inverse of said number of databases within which each of said plural n-grams appear to produce an altered weight for each of said plural n-grams;
   (f) multiplying, for each of the plural n-grams, a number of times that n-gram appears in the textual passage by the altered weight of that n-gram from step (e) to produce a product for each n-gram, per language, and summing those products to produce a language passage weight for each language for the textual passage;
   (g) determining, based upon a comparison of the language passage weights from step (f) the most likely language or languages for the textual passage.

2. The method of claim 1 wherein said plural n-grams have a size selected from the group consisting of bi-grams, tri-grams, and quad-grams.

3. The method of claim 1 wherein said plural n-grams are anchored n-grams.

4. The method of claim 1 wherein said plural n-grams are replacement-type n-grams.

5. The method of claim 1 wherein said plural n-grams are any combination of n-grams, including anchored n-grams and/or replacement-type n-grams, and/or n-grams of different lengths.

6. The method of claim 1 wherein said textual passage comprises 20 or more words.

7. The method of claim 1 wherein said textual passage comprises 40 or more words.

8. A method of determining the language of a textual passage, the method comprising the steps of:
  (a) filtering plural short words from a textual passage;
  (b) comparing each of said plural short words against a plurality of databases, wherein each of said databases comprises multiple short words associated with a different language;
  (c) determining an initial weight for each of said plural short words, per language, by calculating the frequency with which each of said plural short words appears in each of said databases and dividing said frequency by the total number of the multiple short words in said respective database;
  (d) determining the number of said databases within which each of said plural short words appear;
  (e) altering said initial weight for each of said plural short words by multiplying said initial weight with the inverse of said number of databases within which each of said plural short words appear to produce an altered weight for each of said plural short words;
  (f) multiplying, for each of the plural short words, a number of times that short word appears in the textual passage by the altered weight of that short word from step (e) to produce a product for each short word, per language, and summing those products to produce a language passage weight for each language for the textual passage;
  (g) determining, based upon a comparison of the language passage weights from step (f) the most likely language or languages for the textual passage.

9. A method of determining the language of a textual passage, the method comprising the steps of:
  (a) filtering plural short words from a textual passage and parsing said textual passage into plural n-grams;
  (b) comparing each of said plural n-grams and said plural short words against a plurality of databases, wherein each of said databases comprises multiple n-grams and short words associated with a different language;
  (c) determining an initial weight for each of said plural n-grams and said plural short words, per language;
  (d) determining the number of said databases within which each of said plural n-grams and said plural short words appear;
  (e) altering said initial weight for each of said plural n-grams and said plural short words by multiplying said initial weight with the inverse of said number of databases within which each of said plural n-grams and said plural short words appear to produce an altered weight for each of said plural n-grams and said plural short words;
  (f) multiplying, for each of the plural n-grams and each of the plural short words, a number of times that n-gram or short word appears in the textual passage by the altered weight of that n-gram or short word from step (e) to produce a product for each n-gram and each short word, per language, and summing those products to produce a language passage weight for each language for the textual passage;
  (g) determining, based upon a comparison of the language passage weights from step (f) the most likely language or languages for the textual passage.

10. A system for determining the language of a textual passage, said system comprising a central processing unit coupled to a memory system and a display, wherein said central processing unit operates according to a program retrieved from said memory system, wherein said program is configured to cause the central processing unit to execute steps comprising:
  (a) receiving a textual passage;
  (b) parsing said textual passage into plural n-grams;
  (c) comparing each of said plural n-grams against a plurality of databases, wherein each of said databases comprises multiple n-grams associated with a different language;
  (d) assigning an initial weight to each of said plural n-grams, per language, by calculating the frequency with which each of said plural n-grams appears in each of said databases and dividing said frequency by the total number of n-grams in said respective database;
  (e) calculating the number of said databases within which each of said plural n-grams appear;
  (f) altering said initial weight assigned to each of said plural n-grams by multiplying said initial weight with the inverse of said number of databases within which each of said plural n-grams appear to produce an altered weight for each of said plural n-grams;
  (g) multiplying, for each of the plural n-grams, a number of times that n-gram appears in the textual passage by the altered weight of that n-gram from step (f) to produce a product for each n-gram, per language, and summing those products to produce a language passage weight for each language for the textual passage;
  (h) determining, based upon a comparison of the language passage weights from step (g) the most likely language or languages for the textual passage.

11. The system of claim 10 further comprising a scanner and an optical character recognition device, wherein said scanner and said optical character recognition device are connected to said central processing unit, wherein said program receives a textual passage from a document scanned by said scanner.

12. The system of claim 10 wherein said program comprises a user interface that allows a user to enter said textual passage.

13. The system of claim 12 wherein said user interface is a graphical user interface.

14. The system of claim 12 wherein said user interface displays the identified language.

15. The system of claim 10 wherein said program comprises a user interface that allows a user to enter a Uniform Resource Locator that contains said textual passage.

16. The method of claim 1, comprising determining the most likely language for the textual passage as that with the highest passage weight.

17. The method of claim 8, comprising determining the most likely language for the textual passage as that with the highest passage weight.

18. The method of claim 9, comprising determining the most likely language for the textual passage as that with the highest passage weight.

19. The system of claim 10, wherein said program is configured to cause the central processing unit to determine the most likely language for the textual passage as that with the highest passage weight.

* * * * *